Patented May 5, 1936

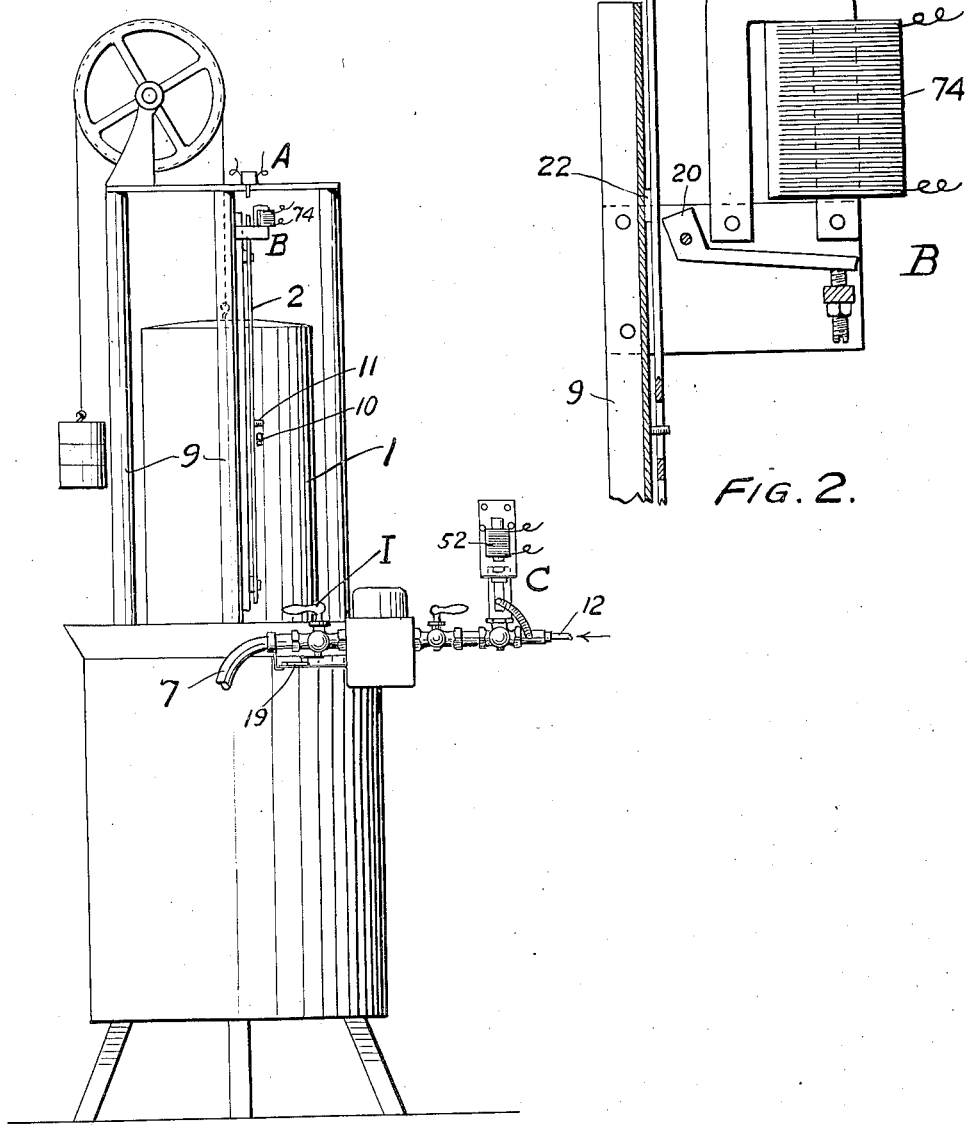

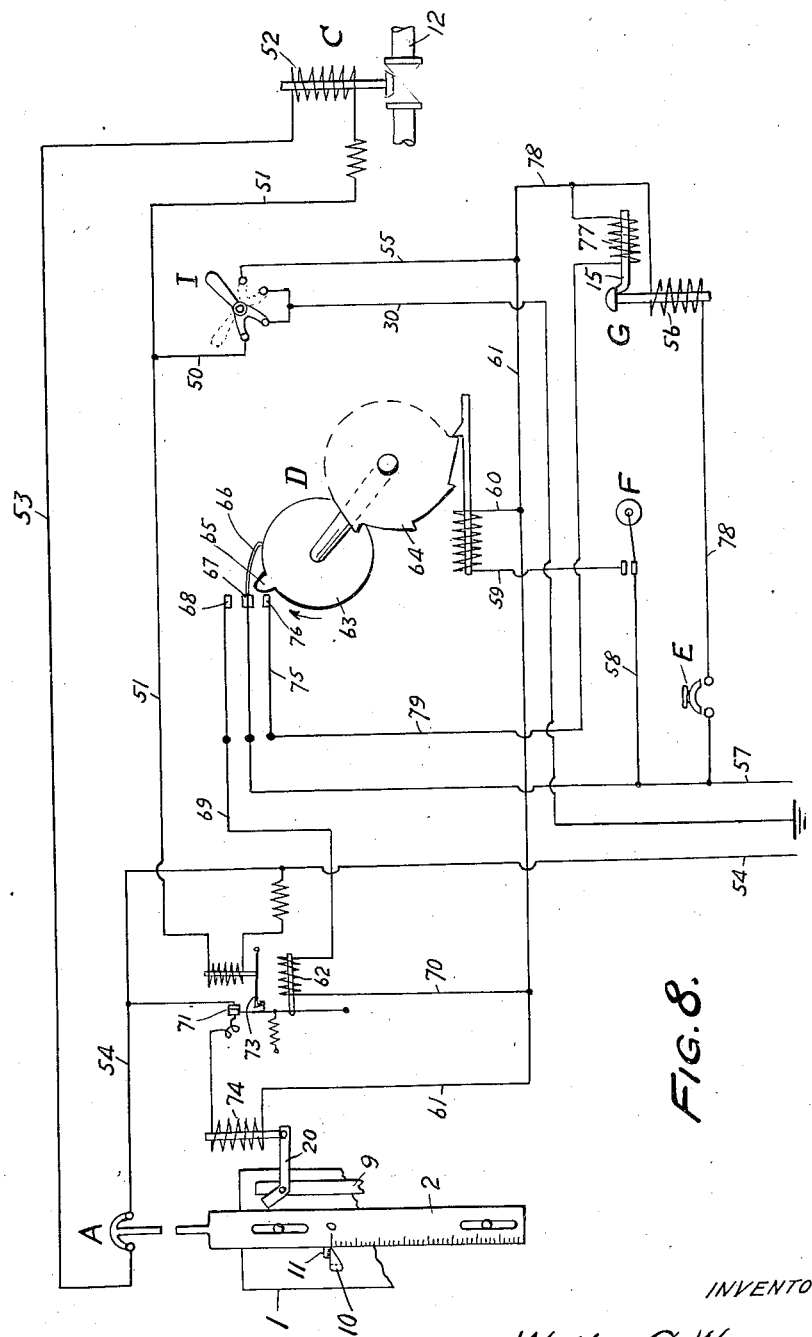

2,039,506

UNITED STATES PATENT OFFICE 2,039,506

TESTING OR PROVING GAS OR FLUID METERS

Walter C. Wagner, Ardmore, and Frederick Strattner, Manoa, Pa.

Application April 21, 1934, Serial No. 721,652

7 Claims. (Cl. 73—51)

By reason of their construction many types of fluid meters are so constructed that in operation their center of gravity shifts. Examples of such meters are gas meters, oscillating steam condensate meters, rotary condensate meters, and house type water meters. Our invention will be described with special reference to testing or proving gas meters, but we wish it to be understood that in doing so we do not intend to limit our invention in respect to the character of the meter tested so long as its center of gravity changes in the normal flow of fluid through it.

The customary way to test or prove a gas meter briefly stated, is to pass a measured quantity of air or gas from a gas holder, or prover as it is sometimes called, through the gas meter, and to then note the advance of the test-hand on the meter which should, of course, if the meter is in calibration, indicate the same number of cubic feet that has passed through the meter. If the meter is not in calibration, the position of the test-hand will indicate more or less cubic feet than have actually passed through the meter, and from this difference the error in the meter is ascertained. The test-hand of the meter is small, and its scale is indicated in rather coarse lines, so that it is difficult to read accurately and the reading is subject to error. Again, to pass a predetermined volume of gas or air through the meter from the gas holder or prover requires manipulation of the prover, in order that the test may start on the zero of the scale. The attention of the attendant is required to manipulate the valves of the prover during the entire test. These remarks apply also to other fluid meters.

Objects of the present invention are: (1) to obviate the defects and inaccuracies above recited; (2) to provide for automatically and accurately testing meters with a minimum of chance for error and in such a way that all that is required is to start the test, and to read a scale at the end of the test, while the attendant may engage in other occupations, such as preparing for succeeding tests, while one test is being automatically carried on; (3) to provide for automatically fixing the zero on the scale of the prover; (4) to dispense with all reference to the meter register; and (5) to generally improve the testing or proving of meters in such a way that the operation is accelerated, simplified and made more accurate than heretofore.

To these and other ends hereinafter stated, the invention comprises the testing of meters by swinging or oscillating the same a given number of swings or oscillations due to the passage of fluid through them, and which indicate that the meter, if calibrated, should pass during that number of swings or oscillations a definite and corresponding volume of fluid; and, at the same time, passing through the meter and causing it to swing or oscillate a measured volume of fluid, which is ascertained from reading a scale on the holder, and which should correspond in volume and cubic feet with the number of swings or oscillations of the meter, and any difference between the two indicates the error of the meter.

The invention also comprises means for fixing the zero of the scale on the prover automatically at each test. The invention further comprises devices and circuits for automatically controlling and co-ordinating the various stages of the test. The invention also comprises the improvements to be presently described and finally claimed. In the following description, reference will be made to the accompanying drawings forming part hereof and in which:

Fig. 1 is an elevational view of a prover having embodied therein means for automatically fixing the zero of the scale and other means for controlling the supply of air or gas, together with a combined hand-valve and circuit controller;

Fig. 2 is a view drawn to an enlarged scale and illustrating features of the invention shown in Fig. 1;

Fig. 8 is a diagrammatic and schematic view illustrating the construction and operation of the device, and of the electrical connections and devices by which it is controlled.

Figures 3, 4:
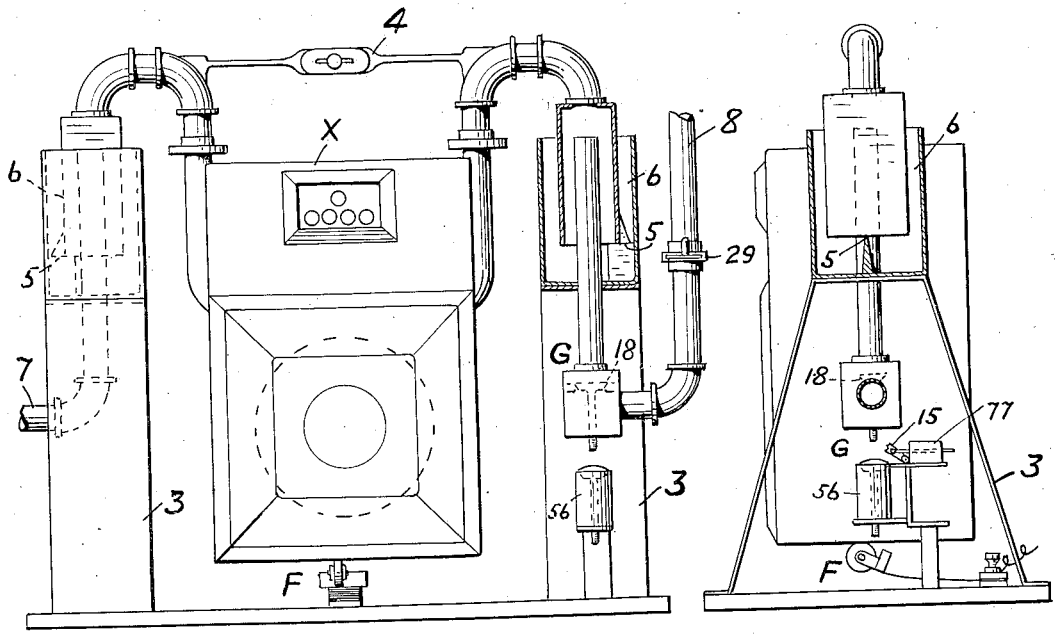
Fig. 3 is a front elevation of a cradle, showing mounted therein a gas meter which is rocked by the passage through it of air supplied from the prover.
Fig. 4 is an end view, partly in section, of Fig. 3.
Figures 5, 7:
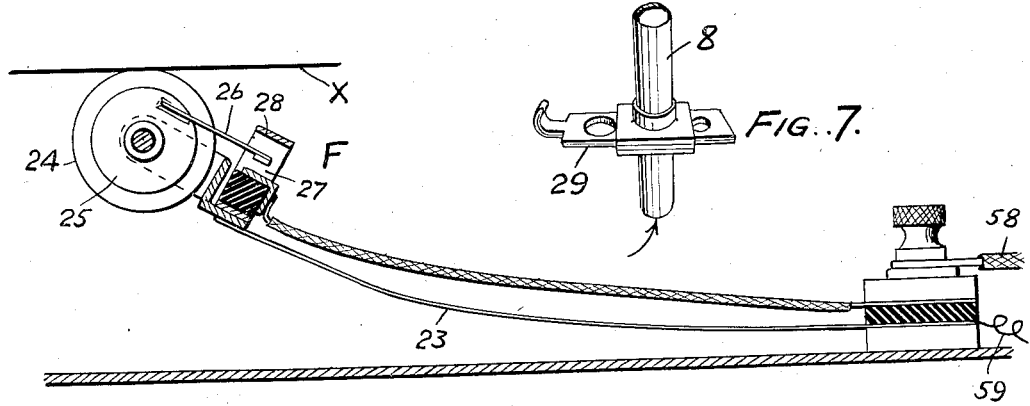
Fig. 5 shows a circuit interrupter operated by the oscillations in the meter and drawn to an enlarged scale.
Fig. 7 shows an orifice plate, drawn to an enlarged scale and shown at the discharge side of the cradle in Fig. 3.
Figure 6:
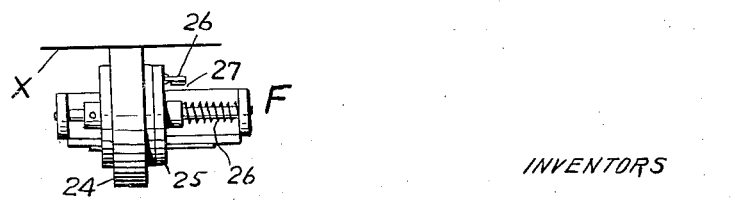
Fig. 6 is an end view of the device shown in Fig. 5.

Referring to the drawings, in Fig. 1 there is illustrated a standard form of prover having an inverted bell 1 and to which there is added a self-adjusting scale 2, a manually operated valve I on the outlet of the prover with a circuit-changing switch as an integral part of it, and an automatic filling valve C for the prover. There is also provided a circuit maker and breaker A and a scale detent B. The details of construction of the parts referred to will be hereinafter described.

In Figs. 3 and 4 there is illustrated a cradle 3 and a yoke or meter bar 4 suspended or supported upon knife edges 5, and fitted with fluid seals 6 so that air may be passed from the prover, shown in Fig. 1, by the connection 7 to and through the meter and out at the connection 8. The meter X to be tested is suspended from the yoke 4 and rocked on the knife edges 5. The meter rocks when air is passed through it by way of the connections 7 and 8, because the bellows and associated parts, which are provisions of the meter, too well understood to require illustration or description, in breathing, change the center of gravity of the meter, and in that way cause it to rock back-and-forth at the strokes of the bellows.

The scale 2 is secured to the frame 9 of the prover in such a way that it is afforded a short range of up-and-down motion, and it is lifted, but unrestrained for downward movement, by a projection 10 on the bell, which cooperates with the projection 11 on the scale. The zero of the scale is opposite or at the projection 11. The valve C controls the inlet 12 for air under pressure to the interior of the bell, and it is normally closed but is opened by an electro-magnet 52. The connection 12 is entirely independent from the connection 7, although they happen to be shown in line in Fig. 1, and each of them leads to the interior of the bell. Prior to starting a test, the meter X is mounted in the yoke 4 and coupled with the connections 7 and 8, and the valve at G, (which is a normally closed valve opened by the plunger of the electro-magnet 56 and held open by the catch 15 of the electro-magnet 77,) is permitted to remain closed. The valve C through instrumentalities that will be described, is opened, and air under pressure enters the bell 1 and raises it. The bell, as it approaches the top of its stroke by means of the pins 10 and 11, carries the scale upward with it, until the scale, acting through the circuit-closer A, as will be described, causes the valve C to close and shut off the air supply. The hand-valve I in the connection 7 is opened and, inasmuch as the valve 18 is closed, no air passes through the meter, but the controller 19, attached to hand-valve I, establishes circuits, which will be described in detail, and which, when energized, set the parts in operation as soon as a push-button, shown at E in Fig. 8 is pressed.

The test is started when the operator pushes the button E. The result of this is that the valve 18 (Fig. 3) is opened and the meter swings back and forth as air blows through it and purges it. The bell 1 falls and the scale 2 falls with it, and upon falling for a short distance the scale re-establishes the circuit path at A. The circuit through the circuit maker and breaker at F is made and broken. The circuit maker and breaker at F is supported on the spring arm 23 and it comprises, generally, a roller 24 that rides on the bottom of the meter, and a slip disk 25 provided with a spring contact arm 26 which makes and breaks the circuit at 27 and is restrained by a back stop 28. When the circuit through this maker and breaker at F is made and broken it operates the selector switch D tooth by tooth through pall and ratchet mechanism imparting step by step rotation to it. This rotary motion is used to control contacts and circuits in such a way that the meter swings back and forth while air blows through it and is purged, then the circuits are adjusted in such a way that the detent 20, by the action of its electro-magnet 74, locks and scale in respect to the pad 22 against further motion and holds it in position, then the meter is permitted to rock for a predetermined number of swings. The number of swings depends upon the characteristics of each particular type of meter which is being tested. When the meter has completed that number of swings the selector switch releases the latch 15 (Figure 4) permitting the valve 18 to close in position for another test. The attendant closes the hand-valve re-adjusting the circuits as will be described. Inasmuch as the valve 18 has been closed the time when the attendant closes the hand-valve is not material, and in a similar way the scale may be read at the attendant's convenience. A test may be repeated on the same meter using different sized orifices in the slide 29 so as to test the same meter under different rates of flow. From the time when the scale is locked and its zero position determined, the meter has been permitted to actuate the relay switch through a given number of swings at the end of which the relay switch has closed the valve 18. During that number of swings a certain number of cubic feet of air should have passed from the prover through the meter, and that number of cubic feet is checked with the reading on the scale. Any difference indicates that the meter is out of calibration.

It will be obvious to those skilled in the art that the circuit connections and electrical devices for automatically operating and controlling the various parts, which have been described in the manner indicated, can be readily devised, but a description will be given of the circuits and electro-mechanical devices indicated on the drawings, more particularly in Fig. 8. In Fig. 8 the hand-valve I is in closed position, and its controller connects the wire 30 with the wire 50. From the wire 50 there is a branch 51 through the coil 52 of the prover intake valve C, and thence by the wire 53 through the closed contact at A to the lead 54. The result of this is that the valve C is open, admitting air under pressure to the bell 1 of the prover which, in rising, carries up the scale 2 until the latter breaks the contact at A. The result of this is that the coil 52 is de-energized and the valve C is spring closed. Thus air under pressure is supplied to the bell 1 somewhat in excess of the quantity required for testing the meter, and the bell comes to rest.

Prior to the start of the test, the hand-valve I is turned to open position, with the result that the conductor 30 is connected with the lead 55. This, by 78 connects the coil 56 of the magnet which opens the valve 18 in a circuit path, which is interrupted by the push-button E but which, when completed, is connected to the lead 57.

To start the test, the push-button E is closed or pushed, which completes the circuit through the coil 56, and opens the valve 18 at the outlet of the meter, and this valve is held open by the latch 15. It is the plunger of the coil 56 which opens the valve 18, and the latch or detent 15 holds the plunger in position for keeping the valve 18 open. The passage of air through the meter causes the meter to rock back-and-forth, making and breaking the circuit path from 57 by 58 at the circuit maker and breaker F, and then by the wire 59 through the actuating coil of the selector switch D, and by 60 through wire 61, wire 55, and the bridge of the circuit controller to 30. This sets the selector switch in revolution through the ratchet mechanism 64, which turns the controller disk 63 with a step-by-step motion. For several swings of the meter and a limited travel of the controller 63 air is blown through the meter, and the scale 2 descends with the bell 1. Upon the completion of these idle swings of the meter, the projection 65 on the disk 63 rides under the toe 66 and shifts the contact 67 into contact with the contact 68. The result of this is that current passes from 57 through contacts 67 and 68 by conductor 69 through the coil 62, and by 70 to 61, and thence by 55 through controller contacts to lead 30. The energization of the coil 62 closes the contacts at 71, and latch 73 holds these contacts closed. There is then a circuit from 30 through the switch contacts at I, and by 55, 61, coil 74, through closed contact 71 to the line 54. The result of this is that the detent 20 locks the scale 2 against further movement, and the latch 73 keeps it locked until a later period in the cycle.

The test is now under way, and the repeated swings of the meter cause the ratchet mechanism to drive or advance the disk 63, and this continues with a step-by-step motion until the predetermined number of swings of the meter have occurred. Then the high part 65 passes under contact arm 75 and holds its contact 76 against the contact 67. The result of this is that the valve 18 is permitted to close, and this is done by the withdrawal of the catch 15. That is effected by the energization of the coil 77 by the circuit from 30, through the switch contact bridge at I, the wire 55, the wire 78, the wire 79, the contacts 76 and 67, and the wire 57. As this is accomplished, the high part 65 has cleared the contact 76 and all the contacts of the selector switch are broken. The scale is then read, and the test is complete with the parts in the positions that they originally occupied.

Inasmuch as those skilled in the art can, from the foregoing description, apply our improvements to meters other than gas meters and in which the specific gravity changes, without the exercise of invention, we do not deem it necessary to repeat the description of our invention in connection with meters of the character specified other than gas meters.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

We claim:

1. For testing or proving meters of the type recited the combination of rockable means for supporting the meter, a prover and its connections for passing fluid through the meter to cause it to rock, a valve and its actuating means responsive to a predetermined number of swings of the meter and operative to interrupt the flow of fluid from the prover, and means for indicating the volume of fluid passed from the prover during the predetermined number of swings of the meter.

2. For testing or proving meters of the type recited the combination of rockable means for supporting the meter, a prover and its connections for passing fluid through the meter to cause it to rock, a valve and its actuating means responsive to a predetermined number of swings of the meter and operative to interrupt the flow of fluid from the prover, a scale arranged to ride on the bell of the prover, and restraining means for interrupting the descent of the scale and establishing its zero position at the start of the test.

3. For testing or proving meters of the type recited the combination of rockable means for supporting the meter, means for passing fluid through the meter thereby rocking it, means for controlling the quantity of fluid passed through the meter to rock it a predetermined number of times, and means for ascertaining the quantity of fluid passed through the meter.

4. For testing or proving meters of the type recited the combination of, rockable means for supporting the meter, means for passing sufficient fluid through the meter to cause it to swing a predetermined number of times, and means for ascertaining the volume of fluid passed through the meter in order to effect the predetermined number of swings.

5. For testing and proving meters of the type recited the combination of, a prover having a bell and fluid inlet valve and a hand operated outlet valve, said inlet valve being normally closed, electrical means for holding the inlet valve open and for closing the inlet valve when the bell rises to its upper limit, a scale riding on the bell, a cradle for the meter, a valve at the outlet of the meter, a connection from the prover outlet valve through the meter, an electrical controller operated with the prover outlet hand valve, a selector switch, a circuit maker and breaker operated by the rocking of the cradle, circuit and mechanical and electrical connections controlled by the circuit maker and breaker and by the controller and adapted to open said prover inlet valve and said meter outlet valve and to clamp said scale, and a push button for controlling the circuit connections.

6. In means for testing or proving meters of the type recited the combination of a meter bar having inlet and outlet connections, knife edge supports for the meter bar, fluid seals in the inlet and outlet connections, and a valve for the outlet connection.

7. In means for testing or proving meters of the type recited the combination of a prover having a bell, connections for passing the contents of the bell through the meter as the bell descends, a scale arranged to ride on the bell, and restraining means for interrupting the descent of the scale when the test is started to establish its zero position.

WALTER C. WAGNER.
FREDERICK STRATTNER.